United States Patent
Blöchlinger et al.

(10) Patent No.: US 6,307,175 B1
(45) Date of Patent: Oct. 23, 2001

(54) METHOD OF PRODUCING A NONCIRCULAR COOLING BORE

(75) Inventors: Michael Blöchlinger, Aarau; Ivan Luketic, Untersiggenthal, both of (CH); Klaus Semmler, Lauchringen; Günter Wilfert, Valley, both of (DE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/273,756

(22) Filed: Mar. 22, 1999

(30) Foreign Application Priority Data

Mar. 23, 1998 (EP) .................................. 98810252

(51) Int. Cl.⁷ .................................. B23K 26/00
(52) U.S. Cl. .................... 219/121.71; 219/121.72; 219/121.8
(58) Field of Search ................ 219/121.69, 121.7, 219/121.71, 121.72, 121.78, 121.8, 121.82, 121.85

(56) References Cited

U.S. PATENT DOCUMENTS

| | | |
|---|---|---|
| 4,197,443 | 4/1980 | Sidenstick . |
| 5,216,808 | 6/1993 | Martus et al. . |
| 5,609,779 | 3/1997 | Crow et al. . |
| 5,683,600 | 11/1997 | Kelley et al. . |
| 5,837,964 | * 11/1998 | Emer et al. .................... 219/121.71 |
| 5,881,445 | * 3/1999 | Mauro ................................. 29/558 |
| 5,967,755 | * 10/1999 | Czech et al. .................... 416/241 R |
| 6,156,133 | * 12/2000 | Czech et al. ........................ 148/525 |

FOREIGN PATENT DOCUMENTS

0228338B1   7/1987   (EP) .

* cited by examiner

*Primary Examiner*—Tom Dunn
*Assistant Examiner*—Colleen Cooke
(74) *Attorney, Agent, or Firm*—Burns, Doane, Swecker & Mathis, L.L.P.

(57) ABSTRACT

In a method of forming a cooling bore in a wall of a workpiece, the configuration of a feed section and a diffuser section is selected, a throughbore is produced with a cross-sectional area within the cross-sectional area of the feed section, and the diffuser section is cut out by a beam- or jet-drilling method in such a way that the drilling beam or jet in the region of the feed section remains essentially within the cross-sectional area of the latter.

19 Claims, 4 Drawing Sheets

METHOD OF PRODUCING A NONCIRCULAR COOLING BORE

BACKGROUND OF THE INVENTION

1. Field of the Invention

The invention relates to a noncircular cooling bore, in particular for the film cooling of a wall in a hot-gas environment. The invention also relates to a method of producing a noncircular cooling bore.

2. Discussion of Background

To increase the output and the efficiency, increasingly higher turbine inlet temperatures are being used in modern gas-turbine plants. In order to protect the turbine blades from the increased hot-gas temperatures, they must be intensively cooled. At correspondingly high inlet temperatures, purely convective cooling is no longer sufficient. The film-cooling method is therefore often used. In this case, the turbine blades are protected from the hot gas by a cooling film. To this end, openings, for example bores, through which the cooling air is blown out, are made in the blades.

In order to achieve as high a cooling effect as possible, the cooling air which is blown out must be deflected as rapidly as possible and flow in a protective manner along the profile surface. In order to also protect the zones lying between the bores, rapid lateral spreading of the cooling air is also necessary. This may be achieved by the cooling-air bores having a diffuser, which on account of the lateral widening permits a wider area of the surface to be covered. To further improve the mixing behavior, geometrical diffuser forms in which the bore is widened not only laterally but also on the downstream side of the bore are used.

For example, publication EP-B-228 338 describes a cooled wall having a cooling-medium passage, the diffuser section of which widens laterally toward the cooling-medium outlet and the downstream flat surface of which diverges away from the axis.

The blow-out rates in the case of these geometrical diffuser forms are small, so that there is little risk of the cooling air passing through the flow boundary layer. The cooling efficiency can therefore be increased considerably compared with a cylindrical bore.

The accuracy with which the workpieces to be provided with cooling holes must be produced represents a significant cost factor. Large wall tolerances of up to 10% or even up to 20% permit the components to be produced cost-effectively. On the other hand, the fluctuations in the wall thickness lead to variations in the opening ratio of the cooling bores as a function of the wall thickness. The accompanying non-uniform film-cooling effectiveness leads either to the costly redesign of the weakest points or to the occurrence of overheated spots on the wall surface, a factor which drastically reduces the service life of the component.

The production of such holes by a spark-machining machining method, as described, for instance, in publication U.S. Pat. No. 4,197,443, has, in addition to the high production costs, the disadvantage that the use of a spark-machining grid, even in the case of small surface tolerances, leads to greatly varying opening ratios of the individual cooling holes. In addition, the spark-machining method cannot be used in the case of ceramically coated surfaces, since the latter are electrically insulating. In this case, the cooling holes must be produced before the coating. The subsequent coating generally covers part of the diffuser opening, as a result of which the cooling properties of the holes are affected. It then becomes necessary to remove the obstructing material in a further step of the method. For example, publication U.S. Pat. No. 5,216,808 describes a method of producing or repairing a gas-turbine component. In this case, after a protective coating has been applied to the component, a UV laser beam is directed toward the position of a film-cooling hole in order to remove obstructing coating material athermally.

In the laser drilling of turbine blades, two drilling methods are mainly used. In percussion drilling, a hole is bored to the nominal diameter by a number of laser pulses with a beam axis fixed relative to the workpiece. With this method, however, only cylindrical holes are easy to produce. In the trepanning drilling method, a finely focused laser beam is moved relative to the workpiece and the hole is thus cut out. In the production of cooling holes having a diffuser by a laser-drilling method, the problem occurs that the length of the cylindrical air-inlet passage also increases as the wall thickness increases. This inlet passage is damaged by the laser beam during the cutting-out of the widening diffuser. The sharp-edged damage which occurs constitutes a serious strength problem. In addition, the inlet opening and thus the flow through the cooling bore change. For this reason, the trepanning method for cooling holes having a diffuser can only be used in the case of small wall thicknesses.

Publication U.S. Pat. No. 5,609,779 discloses a method of forming an opening in a metallic component wall, the opening having a widening diffuser. The noncircular diffuser is produced by an Nd:YAG laser beam being directed within a few laser pulses in an accelerated manner from the center line of the opening to the edge of the diffuser. The pulse rate and the power of the laser are selected in such a way that the metal is vaporized by the laser beam. A disadvantage is that the diffusers which are produced turn out to be very variable with such a method. However, uniform effectiveness of the cooling openings is imperative in modern gas turbines on account of the close dimensioning of the components.

SUMMARY OF THE INVENTION

Accordingly, one object of the invention is to provide a novel method with which a cooling bore can be formed in a wall in a cost-effective, accurate and highly flexible manner. In particular, the method is to permit the cooling bore to be formed irrespective of the production tolerances of the wall thickness and is to be suitable for all wall thicknesses. Furthermore, a cooling bore which can be produced in a cost-effective and flexible manner is to be provided. This object is achieved by the method of forming a cooling bore as claimed in claim 1 and the noncircular cooling bore as claimed in claim 13.

The method according to the invention for forming a cooling bore in a wall of a workpiece, the cooling bore, in the flow sequence, having a feed section of constant cross-sectional area and a diffuser section widening toward an outlet at an outer surface of the wall, comprises the following steps:

A) selecting the shape and size of the cross-sectional area and an axis of the feed section; B) selecting the depth of the diffuser section and the shape and size of its discharge area at the outlet; C) producing a throughbore having a cross-sectional area which lies within the cross-sectional area, selected in step A, of the feed section; and D) cutting out the diffuser section with a beam- or jet-drilling method, the drilling beam or jet being directed in such a way that, in the region of the feed section, it remains essentially within the cross-sectional area selected in step A.

The invention is accordingly based on the idea of cutting out the diffuser section of a cooling bore with a drilling beam or jet in such a way that the feed section is not damaged or is only slightly damaged, as a result of which the cooling bore obtains high strength.

The flow of the cooling medium through the cooling bore during operation establishes a direction of flow in the cooling bore. The shape and size of the cross-sectional area of the feed section determine the quantity of cooling medium flowing through. The method according to the invention offers the advantage that the cooling bore can be cut in an accurate and flexible manner by the use of a drilling-beam or drilling-jet method, in particular a laser-drilling method. The method is suitable for uncoated components as well as for metallically or ceramically coated components. In the latter case, the cooling bores can be produced after the coating in a single operation. It is not necessary to drill the holes before the coating and to expose the obstructed openings again after the coating. Damage to the feed section is minimized owing to the fact that the drilling beam or jet remains essentially within the cross-sectional area of the feed section when cutting out the diffuser section.

The beam- or jet-drilling method used is preferably a laser-drilling method, in particular a pulsed laser-drilling method. In this case, a pulsed Nd:YAG laser or a pulsed $CO_2$ laser is preferably used. However, the use of other drilling beams or jets, for instance a water jet, is also within the scope of the invention.

The diffuser section is preferably cut straight in step D, so that the boundary surfaces of the diffuser section have no curvature in the direction of flow of the cooling bore. The strength of the cooling bore can be further increased by the feed section being cut out to the final contour in a further step E. Such a step increases the quality of the feed section and thereby contributes to the quality and strength of the entire cooling bore.

For the feed section, an elliptical, in particular circular, cross section is preferably selected in step A. The cross section of the feed section is at the same time taken perpendicularly to the axis of the cooling bore.

The axis of the feed section intersects the outer surface advantageously at an angle $\alpha<90°$ and thereby defines the direction of tilt of the cooling bore. The film-cooling effectiveness of the cooling bore can be increased by the discharge area of the diffuser section being selected in such a way that the diffuser section widens toward the outer surface of the wall at least in the direction of tilt of the axis. That boundary surface of the diffuser section which lies in the opposite direction to the direction of tilt is advantageously rounded off toward the axis, in particular elliptically. As a result, the stability of the cooling bore in the face of external effects increases on the one hand, and on the other hand the rounding-off leads to a further significant reduction in the damage to the feed section when cutting out the diffuser part.

That outlet edge of the diffuser section which lies in the direction of tilt is expediently selected in such a way that it is essentially straight and merges at its ends in a smooth curve into the side edges of the outlet. It is especially expedient to select a circular cross section of radius R for the feed section, and to select that outlet edge of the diffuser section which lies in the direction of tilt in such a way that it merges into the side edges of the outlet with a radius of curvature greater than R.

A further increase in the cooling effectiveness can be achieved if the discharge area of the diffuser section is selected in such a way that the diffuser section widens laterally toward the outer surface of the wall.

The outer surface of the wall, before the throughbore is produced in step C, is advantageously covered at least partly with a protective coating, in particular a ceramic protective coating.

The noncircular cooling bore according to the invention in a wall of a workpiece comprises a feed section of constant cross-sectional area and a diffuser section, which widens toward an outlet at a first surface of the wall. In this case, the feed section comprises an entry section, which emerges at a second surface of the wall, and a delivery section adjoining the diffuser section, the length of the entry section at the axis being at most 40% of the length of the feed section. Furthermore, the boundary surfaces of the diffuser section are straight in the direction of flow of the cooling bore, and the tangents to the boundary surfaces through the axis run in the interior of the delivery section and intersect the feed section at most in the entry section.

Such a noncircular cooling bore, on account of its design, can easily be produced by a laser-drilling method. The relative sizes of the entry section and the delivery section ensure that the feed section is not damaged too severely by the laser beam. The condition at the tangents to the boundary surfaces ensures that, if the beam is suitably directed, a straight laser beam, when cutting out the diffuser, damages the feed section at most in the region of the entry section, but otherwise passes through the opening in the second surface without affecting part of the component wall.

The axis of the cooling bore expediently intersects the first surface of the wall at an angle of between 10° and 60°, preferably at an angle of between 15° and 50°, especially preferably at an angle of between 25° and 35°. The cooling effectiveness of the cooling bore can be further increased if the diffuser section widens toward the first surface of the wall at least in the direction of tilt of the axis or if the diffuser section widens laterally toward the first surface of the wall. The effectiveness can be increased to an especially marked degree if lateral widening and downstream widening are combined.

That boundary surface of the diffuser section which lies in the opposite direction to the direction of tilt is rounded toward the axis, preferably elliptically. As a result, the stability of the cooling bore in the face of external effects increases on the one hand, and on the other hand the rounding-off leads to a further significant reduction in the damage to the feed section when cutting out the diffuser part. That boundary surface of the diffuser section which lies in the direction of tilt is preferably essentially flat and merges in a smooth curve into the side surfaces.

The feed section preferably has a circular cross section of radius R. The length of the feed section is then expediently selected in such a way that it is at least 2R at its shortest boundary surface. A well-defined cylindrical opening region, which determines the cooling-medium quantity flowing in during operation, is thereby established.

In a development of the invention, the first surface of the wall is covered at least partly with a protective coating, in particular a ceramic protective coating. In a further development of the invention, the wall is the outer wall of a hollow-profile body, in particular of a gas-turbine blade.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
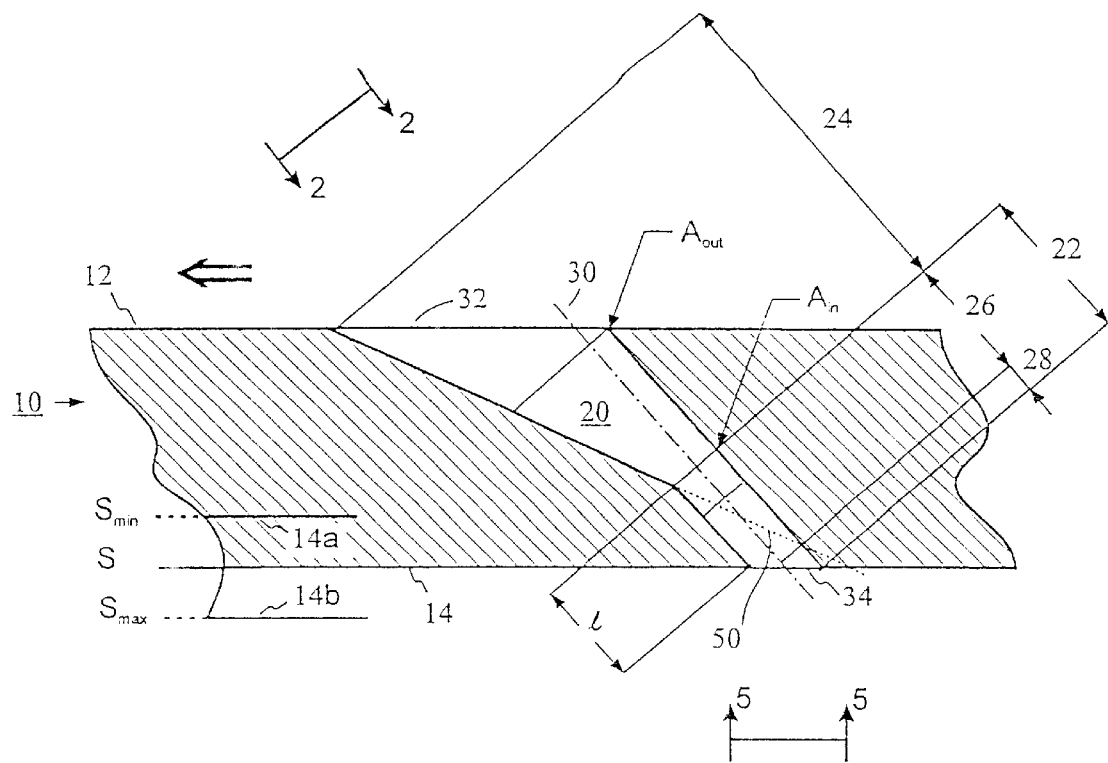
FIG. 1 shows a cross section through a wall with a cooling bore according to the invention.

Only the elements essential for the understanding of the invention are shown. Not shown, for example, are the complete hollow-profile body of the turbine blade and the entire arrangement of the cooling bores. The direction of flow of the working medium is designated by arrows.

DESCRIPTION OF THE PREFERRED EMBODIMENTS

Referring now to the drawings, wherein like reference numerals designate identical or corresponding parts throughout the several views, an exemplary embodiment of the invention is explained with reference to the cooling bore shown in FIGS. 1 to 3. The cooling bore 20 in a wall 10 extends from an inner surface 14 to an outer surface 12. A hot-gas flow flows along the outer surface 12 in the operative environment of the wall 10. The inner surface 14 is the boundary surface of a cooling-medium chamber, which contains pressurized cooling air on the cooling-chamber side, the cooling bore 20 has a cylindrical feed section 22, whose cross section at the inlet 34 determines the cooling-air quantity flowing through. The diffuser section 24 widens from the feed section 22 toward the outlet 32 at the outer surface 12. As can best be seen in FIG. 2, the widening is effected not only laterally but also downstream. FIG. 3 shows a perspective view of the cooling bore 20.

The component to be provided with cooling bores has a nominal wall thickness $S_{nom}$. As indicated schematically in FIG. 1, a wall thickness of between $S_{min}$ (designation 14a) and $S_{max}$ (designation 14b) is permitted when producing the wall; the actual wall thickness S (designation 14) is therefore between $S_{min}$ and $S_{max}$.

The feed section 22, perpendicularly to its axis 30, has a circular cross section of diameter d. The length l of the feed section 22 is selected in such a way that, at the minimum wall thickness $S_{min}$, it still corresponds to its diameter, that is, it is at least d. If the wall thickness is greater than $S_{min}$, the feed section becomes correspondingly longer. Due to the variation in the wall thickness, the feed section 22 thus changes, but not the diffuser section 24. This design ensures a well defined cooling-air opening irrespective of the production tolerances at each wall thickness.

The boundary surfaces 40-46 of the diffuser section 24 have no curvature in the direction of flow of the cooling medium, that is, along the axis 30. It is thereby possible to cut out these surfaces by a straight laser beam from the outer surface 12 (FIG. 4). As can be seen in FIGS. 2 and 3, however, the boundary surfaces have pronounced rounded-off portions perpendicularly to the axis 30. In this embodiment, the upstream boundary surface is rounded elliptically toward the axis 30. It merges in a smooth curve into the side surfaces 44, 46. The downstream boundary surface 42 of the diffuser is essentially flat and, with a radius of curvature $R_2$, merges smoothly into the side surfaces 44, 46. In this case, $R_2$ is selected to be larger than the radius of the cylindrical section R=d/2. In the exemplary embodiment, $R_2$ is 50% larger than the radius of the cylindrical section 22.

The result of these measures is that the tangents 50 to the boundary surfaces 40-46 through the axis 30 intersect the cylindrical feed section at most in a small entry section 28. The delivery section 26 is not affected by the tangents. Such a cooling bore can therefore be cut out very effectively by a laser beam, since the laser beam, like the tangents 50, damages the feed section 22 at most in the entry section 28 during the cutting-out. The laser beam generally passes through the opening 34 of the feed section without causing damage.

Figure 2:
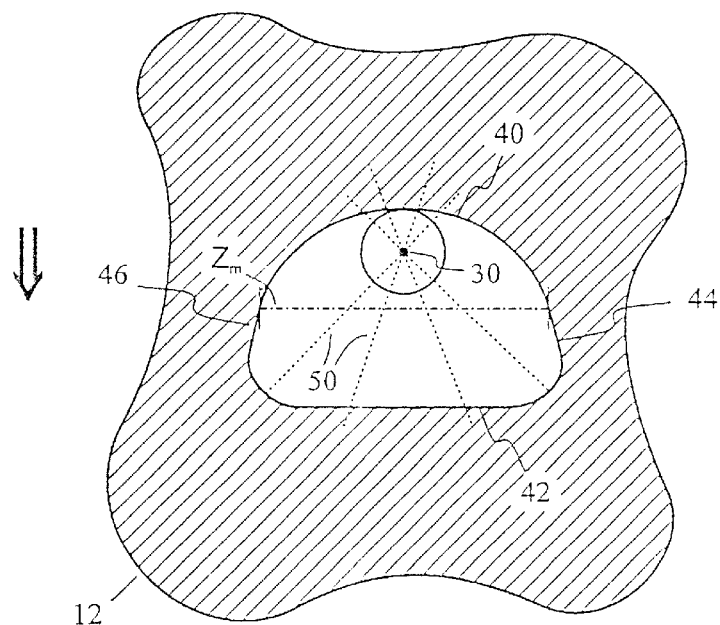
FIG. 2 shows a partial view of the wall in direction 2—2 of FIG. 1.
Figure 3:
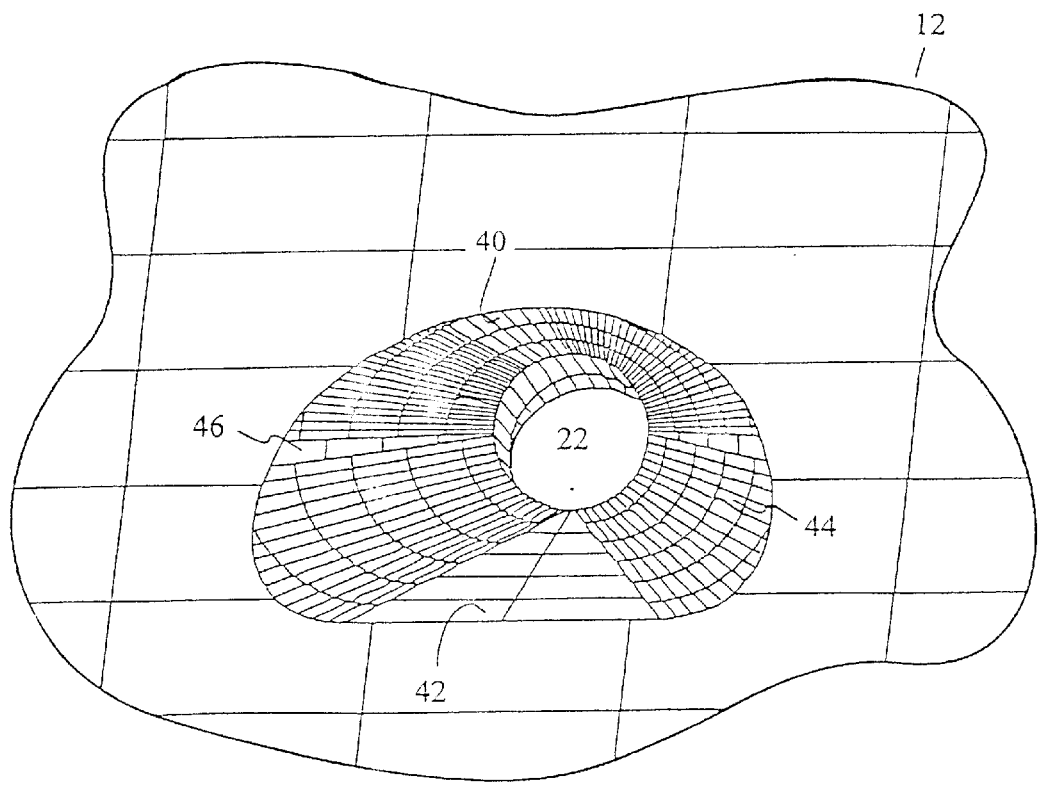
FIG. 3 shows a perspective view of a cooling bore according to the invention.
Figure 4:
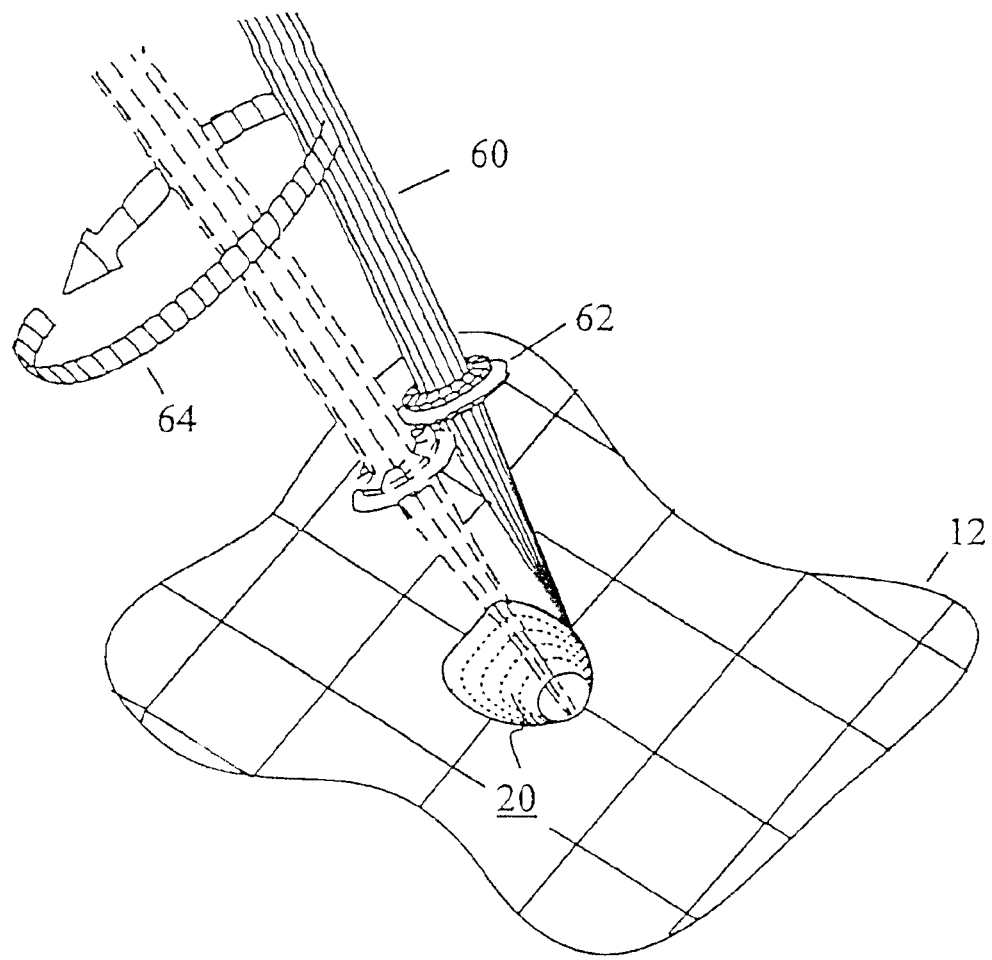
FIG. 4 shows a schematic representation which illustrates the cutting-out of a cooling bore with a laser beam corresponding to an exemplary embodiment of the invention.

A production method according to the invention for a cooling bore as shown in FIGS. 1 to 3 is described below:
the configuration of the hole is established in a first step. The nominal wall thickness and permitted tolerance of the wall thickness are included in the process. The diameter of the cylindrical feed section, its minimum length measured at its downstream edge, and the angle which the hole axis includes with the outer surface are established. At the diffuser section, the shape and size of the discharge area is established, in particular the radius of the elliptical rounded-off portion at the upstream side and the radii of curvature with which the downstream edge merges into the side surfaces. The depth of the diffuser section results from the minimum wall thickness $S_{min}$ permitted and the minimum length of the cylindrical section.

These values are established for the different nominal wall thicknesses in such a way that the aerodynamic parameters of the cooling bores and thus the cooling effectiveness do not change. This is done by virtue of the fact that the opening ratio $A_r$, the mean hole width $Z_m$ and the covering $Z_m/P$ are kept constant. Here, the opening ratio A r is the ratio of the diffuser discharge area $A_{out}$ to the cylindrical inlet area $A_{in}$, measured in each case perpendicularly to the hole axis. The covering results as a ratio of the mean hole width $Z_m$ to the spacing of the cooling bores P.

In a next step, a throughhole, which has a somewhat smaller diameter than the cylindrical feed section, is drilled in the wall. The diffuser section is then cut out with the laser beam at a cutting speed adapted to the respective drilling depth (FIG. 4). In the process, the laser beam 60 is focused with a lense 62 and directed (designation 64) along the contour to be cut out. Finally, the cylindrical section is cut out to the final contour. The laser beam is controlled via a CAD/CAM interface with a conventional CNC machine.

The method described may be used both for uncoated and for metallically or ceramically coated component walls.

Figure 5:
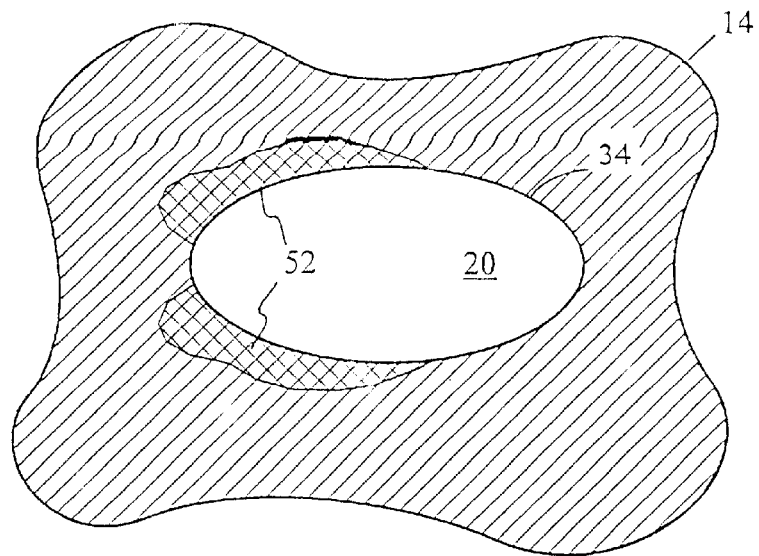
FIG. 5 shows a bottom view of a wall in direction 5—5 of FIG. 1.

FIG. 5, in a bottom view, shows the cooling-chamber-side inlet 34 of a cooling bore 20. The regions 52 at the margin of the opening 34 have been additionally cut out by the laser-drilling process. These regions are kept small due to the configuration according to the invention of the diffuser section.

Figure 6:
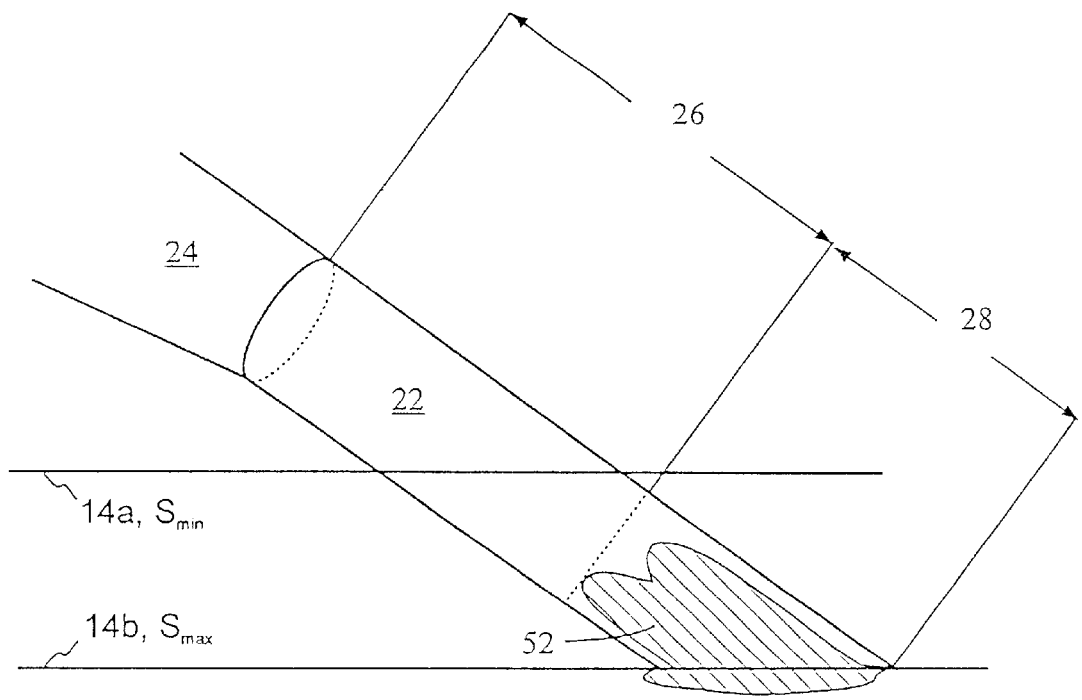
FIG. 6 shows a perspective partial side view of the wall of FIG. 5.

The bottom region of a cooling bore is shown in perspective side view in FIG. 6. The lines designated by designations 14a ($S_{min}$) and 14b ($S_{max}$) indicate the region of the positions of the inner surface which are possible due to the permissible tolerance of the wall thickness. At a wall thickness of $S_{max}$, the damaged region 52 is greatest. At a wall thickness $S_{min}$, no damage occurs. FIG. 6 shows that it is advantageous for reasons of cost to tolerate a certain degree of damage, since the permissible wall-thickness tolerance becomes very small if the feed section is required to be completely free of damage.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for forming a cooling bore in a wall of a workpiece, the cooling bore, in the flow sequence, having a feed section of constant cross-sectional area and a diffuser section widening toward an outlet at an outer surface of the wall, comprising the steps of:
   A) selecting the shape and size of the cross-sectional area and an axis of the feed section;
   B) selecting the depth of the diffuser section and the shape and size of its discharge area at the outlet;
   C) producing a throughbore having a cross-sectional area which lies within the cross-sectional area, selected in step A, of the feed section; and
   D) cutting out the diffuser section with a method selected from the group consisting of beam-drilling and jet-drilling, the drilling beam or jet being directed so that, in the region of the feed section, the drilling beam or jet remains essentially within the cross-sectional area selected in step A;
   wherein the diffuser section is cut straight in step D, so that the boundary surfaces of the diffuser section have no curvature in the direction of flow of the cooling bore.

2. The method as claimed in claim 1, wherein the drilling method used in step D is a laser-drilling method.

3. The method as claimed in claim 1, further comprising:
   E) cutting out the feed section to the final contour.

4. The method as claimed in claim 1, wherein step A comprises selecting an elliptical cross-sectional shape.

5. The method as claimed in claim 1, wherein step A comprises selecting the axis so that it intersects the outer surface of the wall at an angle $\alpha < 90°$.

6. The method as claimed in claim 5, wherein step B comprises selecting the discharge area of the diffuser section so that the diffuser section widens toward the outer surface of the wall at least in the direction of tilt of the axis.

7. The method as claimed in claim 6, wherein step B comprises selecting the discharge area of the diffuser section so that a boundary surface of the diffuser section which lies in the opposite direction to the direction of tilt is rounded off toward the axis.

8. The method as claimed in claim 6, wherein step B comprises selecting the discharge area of the diffuser section so that an outlet edge of the diffuser section which lies in the direction of tilt is essentially straight and merges at its ends in a smooth curve into the side edges of the outlet.

9. The method as claimed in claim 8, wherein step A comprises selecting a circular cross section of radius R for the feed section, and wherein step B comprises selecting so that an outlet edge of the diffuser section which lies in the direction of tilt so that it merges into the side edges of the outlet with a radius of curvature greater than R.

10. The method as claimed in claim 1, wherein step B comprises selecting the discharge area of the diffuser section so that the diffuser section widens laterally toward the outer surface of the wall.

11. The method as claimed in claim 1, further comprising covering the outer surface of the wall, before step C, at least partly with a protective coating.

12. The method as claimed in claim 2, wherein the drilling method used in step D is a pulsed laser-drilling method.

13. The method as claimed in claim 4, wherein step A comprises selecting a circular cross-sectional shape.

14. The method as claimed in claim 7, wherein step B comprises selecting the discharge area of the diffuser section so that a boundary surface of the diffuser section which lies in the opposite direction to the direction of tilt is elliptically rounded off toward the axis.

15. The method as claimed in claim 11, wherein the step of covering the outer surface of the wall comprises covering with a ceramic protective coating.

16. A method for forming a cooling bore in a wall of a workpiece, the cooling bore, in the flow sequence, having a feed section of constant cross-sectional area and a diffuser section widening toward an outlet at an outer surface of the wall, comprising the steps of:
   A) selecting the shape and size of the cross-sectional area and an axis of the feed section;
   B) selecting the depth of the diffuser section and the shape and size of its discharge area at the outlet;
   C) producing a throughbore having a cross-sectional area which lies within the cross-sectional area, selected in step A, of the feed section; and
   D) cutting out the diffuser section with a method selected from the group consisting of beam-drilling and jet-drilling, the drilling beam or jet being directed so that, in the region of the feed section, the drilling beam or jet remains essentially within the cross-sectional area selected in step A;
   wherein step B comprises selecting the discharge area of the diffuser section so that a boundary surface of the diffuser section which lies in the opposite direction to the direction of tilt is rounded off toward the axis.

17. The method as claimed in claim 16, wherein step B comprises selecting the discharge area of the diffuser section so that a boundary surface of the diffuser section which lies in the opposite direction to the direction of tilt is elliptically rounded off toward the axis.

18. A method for forming a cooling bore in a wall of a workpiece, the cooling bore, in the flow sequence, having a feed section of constant cross-sectional area and a diffuser section widening toward an outlet at an outer surface of the wall, comprising the steps of:
   A) selecting the shape and size of the cross-sectional area and an axis of the feed section;
   B) selecting the depth of the diffuser section and the shape and size of its discharge area at the outlet;
   C) producing a throughbore having a cross-sectional area which lies within the cross-sectional area, selected in step A, of the feed section; and
   D) cutting out the diffuser section with a method selected from the group consisting of beam-drilling and jet-drilling, the drilling beam or jet being directed so that, in the region of the feed section, the drilling beam or jet remains essentially within the cross-sectional area selected in step A; and
   covering the outer surface of the wall, before step C, at least partly with a protective coating.

19. The method as claimed in claim 18, wherein the step of covering the outer surface of the wall comprises covering with a ceramic protective coating.

* * * * *